United States Patent [19]

Tanahashi et al.

[11] Patent Number: 5,087,021
[45] Date of Patent: Feb. 11, 1992

[54] FLUID-FILLED CYLINDRICAL ELASTIC MOUNT HAVING ANNULAR FLUID CHAMBER AND ANNULAR MOVABLE MEMBER TO PROVIDE RESTRICTED RESONANCE PORTION

[75] Inventors: Hiroaki Tanahashi, Komaki; Takanobu Nanno, Kasugai, both of Japan

[73] Assignee: Tokai Rubber Industries, Ltd., Aichi, Japan

[21] Appl. No.: 567,619

[22] Filed: Aug. 15, 1990

[30] Foreign Application Priority Data

Aug. 23, 1989 [JP] Japan ............... 1-98554

[51] Int. Cl.⁵ .............................. F16F 13/00
[52] U.S. Cl. .................... 267/140.1 C; 267/140.3; 267/219
[58] Field of Search ........... 267/140.1, 219, 140.3, 267/141.2, 141.3, 141.4, 141.6, 140.2, 140.4, 153; 248/562, 636, 638; 180/300. 312, 902; 280/710; 464/180; 384/99, 220, 536

[56] References Cited

U.S. PATENT DOCUMENTS

| | | | |
|---|---|---|---|
| 3,642,268 | 2/1972 | Hipsher | 267/140.1 X |
| 4,754,956 | 7/1988 | Barone et al. | 267/219 X |
| 4,768,760 | 9/1988 | Le Fol | 267/140.1 |
| 4,789,144 | 12/1988 | Brenner | 248/562 X |
| 4,790,520 | 12/1988 | Tanaka et al. | 267/140.1 |
| 4,838,529 | 6/1989 | Orikawa et al. | 248/562 X |
| 4,865,299 | 9/1989 | Goto | 267/140.1 |
| 4,883,260 | 11/1989 | Kanda | 248/562 X |
| 4,893,799 | 1/1990 | de Fontenay | 248/636 X |

FOREIGN PATENT DOCUMENTS

| | | | |
|---|---|---|---|
| 0332150 | 9/1989 | European Pat. Off. | |
| 7819606 | 1/1979 | Fed. Rep. of Germany | |
| 48-310 | 1/1973 | Japan | |
| 52-16554 | 5/1977 | Japan | |
| 56-164242 | 12/1981 | Japan | |
| 0290250 | 12/1986 | Japan | 267/140.1 |
| 0294235 | 12/1986 | Japan | 267/140.1 |
| 0312535 | 12/1988 | Japan | 267/140.1 |

*Primary Examiner*—Douglas C. Butler
*Attorney, Agent, or Firm*—Oliff & Berridge

[57] ABSTRACT

A fluid-filled cylindrical elastic mount including an inner sleeve, an outer sleeve disposed radially outwardly of the inner sleeve with a predetermined radial spacing therebetween, and a generally annular elastic body interposed between the two sleeves for elastic connection therebetween. The elastic body at least partially defines an annular fluid chamber formed between the two sleeves and extending over the entire circumference of the mount. The fluid chamber has a substantially constant cross sectional area over the entire circumference thereof, and is filled with a non-compressible fluid having a kinematic viscosity of not higher than 100 centistokes. The elastic mount further includes an annular movable member accommodated in the fluid chamber, such that the movable member can be radially displaced relative to the inner and outer sleeves. The movable member and the fluid in the fluid chamber cooperate to provide a restricted resonance portion through which the non-compressible fluid is forced to flow with a resistance upon application of a vibrational load between the two sleeves.

9 Claims, 2 Drawing Sheets

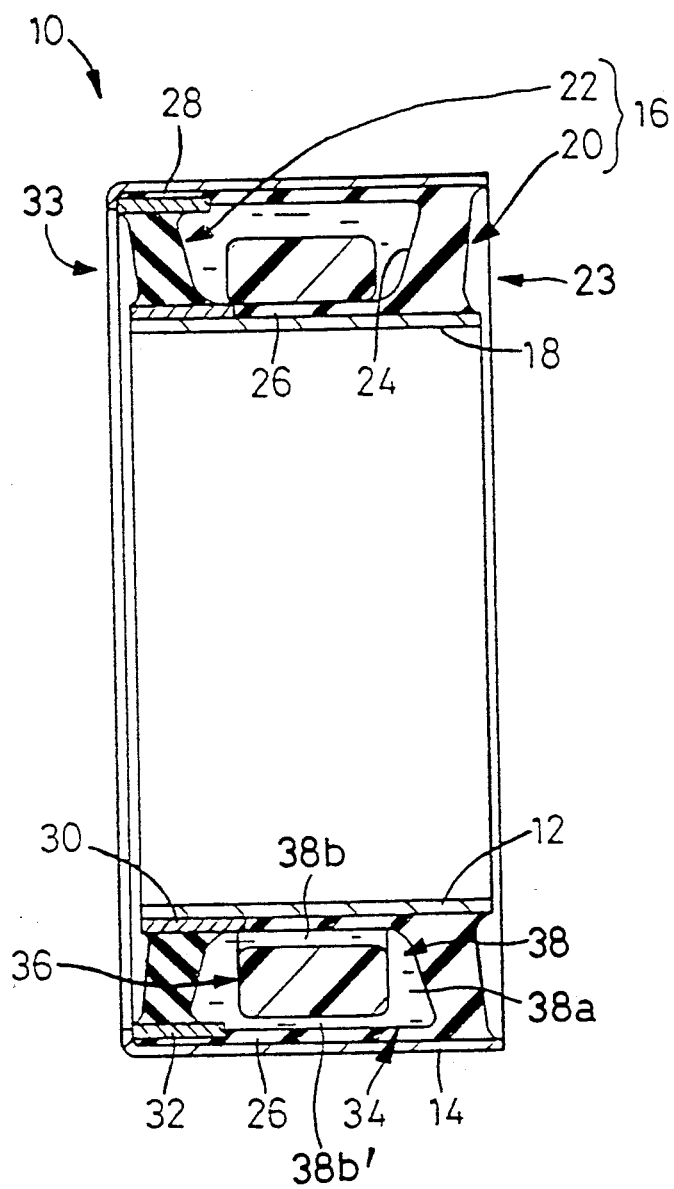

FLUID-FILLED CYLINDRICAL ELASTIC MOUNT HAVING ANNULAR FLUID CHAMBER AND ANNULAR MOVABLE MEMBER TO PROVIDE RESTRICTED RESONANCE PORTION

BACKGROUND OF THE INVENTION

1. Field of the Invention

The present invention relates in general to a fluid-filled cylindrical elastic mount capable of isolating vibrations applied thereto, based on flows of a fluid contained therein. More particularly, the invention is concerned with such a fluid-filled elastic mount capable of exhibiting excellent isolating characteristics with respect to the vibrations applied in any radial direction perpendicular to the axis of the amount.

2. Discussion of the Prior Art

A cylindrical elastic mount is known as a device for elastically or flexibly connecting two members in a vibration system in a vibration damping or isolating manner. An example of such a cylindrical elastic mount is disclosed in laid-open Publication No. 48-310 of unexamined Japanese Utility Model Application. The cylindrical elastic mount disclosed in the publication has an inner and an outer metallic sleeve which are disposed in radially spaced-apart relation with each other. Between these inner and outer sleeves, there is interposed an elastic body for elastically connecting the two sleeves. The thus constructed elastic mount is adapted to isolate vibrations which are applied between the inner and outer sleeves primarily in radial directions perpendicular to the axis of the mount. The cylindrical elastic mount of the above type is widely used as a differential mount, engine mount, body mount or suspension bushing for a motor vehicle, for example.

To meet an increasing requirement for a higher degree of vibration isolating capability, a so-called fluid-filled elastic mount has been recently proposed, as disclosed in laid-open Publication No. 56-164242 of unexamined Japanese Patent Application and laid-open Publication No. 52-16554 of examined Japanese Patent Application. A fluid-filled elastic mount as disclosed in these publications has a pair of fluid chambers which are formed between the inner and outer sleeves, and are disposed opposite to each other in a diametric direction of the mount. The two fluid chambers are held in fluid communication with each other through a suitable orifice passage, so that vibrations applied to the mount may be effectively isolated by resonance of a fluid flowing through the orifice passage. The thus constructed fluid-filled elastic mount provides excellent vibration isolating characteristics, which have not been obtained by the above-described elastic mount that utilizes only elastic deformation of the elastic body for damping the input vibrations.

The conventional fluid-filled elastic mount having the orifice passage as described above is considerably complicated in construction, and therefore suffers from comparatively low production efficiency owing to the cumbersome process of assembling those components which define the orifice passage.

Further, the fluid contained in the fluid-filled elastic mount is forced to flow between the two fluid chambers, through the orifice passage, as a result of relative pressure changes between the two chambers, only when the elastic mount receives vibrations in the radial or diametric direction in which the two fluid chambers are opposed to each other. In other words, upon application of vibrations in the other radial directions of the mount, the elastic mount is incapable of providing a satisfactory effect of isolating the applied vibrations. Thus, it is rather difficult for the conventional fluid-filled elastic mount to provide a sufficient degree of isolating effect for the vibrations applied in all the radial directions perpendicular to the axis of the mount.

Even if vibrations are applied to the fluid-filled elastic mount in only one radial direction, the circumferential orientation of the mount upon installation on a motor vehicle, for example, must be attentively effected so that the direction in which the two fluid chambers are opposed to each other coincides with the radial direction in which the vibrations are applied to the mount, since the mount exhibits sufficient isolating characteristics only for the vibrations applied in that radial direction. Thus, cumbersome procedures and considerable attention are needed for the installation of the elastic mount.

Furthermore, the isolating characteristics based on the fluid flows in the conventional fluid-filled elastic mount are effective only for the vibrations in a relatively narrow frequency range in the vicinity of the resonance frequency of the fluid flowing through the orifice passage. Namely, it is extremely difficult for the conventional fluid-filled elastic mount to provide a sufficient isolating effect over a relatively wide frequency range of input vibrations.

SUMMARY OF THE INVENTION

The present invention was developed in the light of the prior art situations as described above. It is therefore an object of the present invention to provide a fluid-filled cylindrical elastic mount having a simple structure, which is capable of effectively isolating a relatively wide frequency range of input vibrations that are applied in any radial direction perpendicular to the axis of the mount, based on flows of a fluid contained therein.

The above object of the present invention may be achieved according to the principle of the present invention, which provides a fluid-filled cylindrical elastic mount for flexibly connecting two members, including (a) an inner sleeve attached to one of the two members, (b) an outer sleeve attached to the other of the two members, and disposed radially outwardly of the inner sleeve with a predetermined radial spacing therebetween, (c) a generally annular elastic body interposed between the inner and outer sleeves for elastic connection therebetween. The elastic body at least partially defines an annular fluid chamber formed between the inner and outer sleeves and extending over the entire circumference of the mount. The fluid chamber has a substantially constant cross sectional area over the entire circumference thereof, and is filled with a non-compressible fluid having a kinematic viscosity of not higher than 100 centistokes. The fluid-filled cylindrical elastic mount of the invention further includes (d) an annular movable member accommodated in the fluid chamber such that the movable member can be radially displaced within the fluid chamber relative to the inner and outer sleeves. The movable member and the fluid in the fluid chamber cooperate to provide a restricted resonance portion through which the non-compressible fluid is forced to flow with a resistance upon application of a vibrational load between the inner and outer sleeves.

In the fluid-filled cylindrical elastic mount of the present invention constructed as described above, the non-compressible fluid is forced to flow through the restricted resonance portion of the annular fluid chamber, in both circumferential and radial directions of the chamber, when a vibrational load is applied to the mount in one of the radial directions thereof. Consequently, the present elastic mount provides a satisfactory effect of damping or isolating a wide frequency range of vibrations, by utilizing resonance of the fluid masses which flow through the resonance portion in the circumferential and radial directions as described above. Since the resonance portion extends over the entire circumference of the fluid chamber, the elastic mount exhibits excellent damping or isolating characteristics with respect to the vibrations applied in any radial direction perpendicular to the axis of the mount.

The fluid-filled cylindrical elastic mount of the invention has a simplified structure wherein the movable member is accommodated in the fluid chamber to thereby provide the resonance portion through which the fluid undergoes restricted flows upon application of vibrations. Thus, the cylindrical elastic mount having excellent vibration damping or isolating characteristics can be easily produced with considerably high efficiency.

While the present mount is operable with the non-compressible fluid having a kinematic viscosity of not higher than 100 centistokes, the viscosity is preferably 30 centistokes or lower.

In one form of the present invention, the movable member has an inside diameter which is larger than a diameter of an inner circumference of the fluid chamber, and an outside diameter which is smaller than a diameter of an outer circumference of the fluid chamber, and further has an axial dimension which is smaller than that of the fluid chamber. In this arrangement, the non-compressible fluid is allowed to flow through the resonance portion in the circumferential and radial directions of the mount.

In the above form of the invention, a difference between the inside diameter of the movable member and the diameter of the inner circumference of the fluid chamber may be smaller than a difference between the outside diameter of the movable member and the diameter of the outer circumference of the fluid chamber.

In another form of the present invention, the elastic body consists of a first and a second annular elastic member which are opposed to each other in the axial direction of the mount. In this case, the first elastic member has a pocket formed to extend over the entire circumference thereof such that an opening of the pocket being closed by the second elastic member to thereby provide the fluid chamber defined between the first and second elastic members.

In the above form of the invention, the fluid-filled cylindrical elastic mount may further include an inner and an outer support member which are respectively secured to an inner and an outer circumferential surface of the second elastic member, for connecting the second elastic member to the inner and outer sleeves.

The movable member may be made of a synthetic resin having a specific gravity larger than that of the non-compressible fluid.

BRIEF DESCRIPTION OF THE DRAWINGS

The above and optional objects, features and advantages of the present invention will be better understood by reading the following description of a presently preferred embodiment of the invention, when considered in connection with the accompanying drawings, in which:

FIG. 2 is an elevational view in axial cross section taken along line 2—2 of FIG. 1.

DETAILED DESCRIPTION OF THE PREFERRED EMBODIMENT

Figure 1:
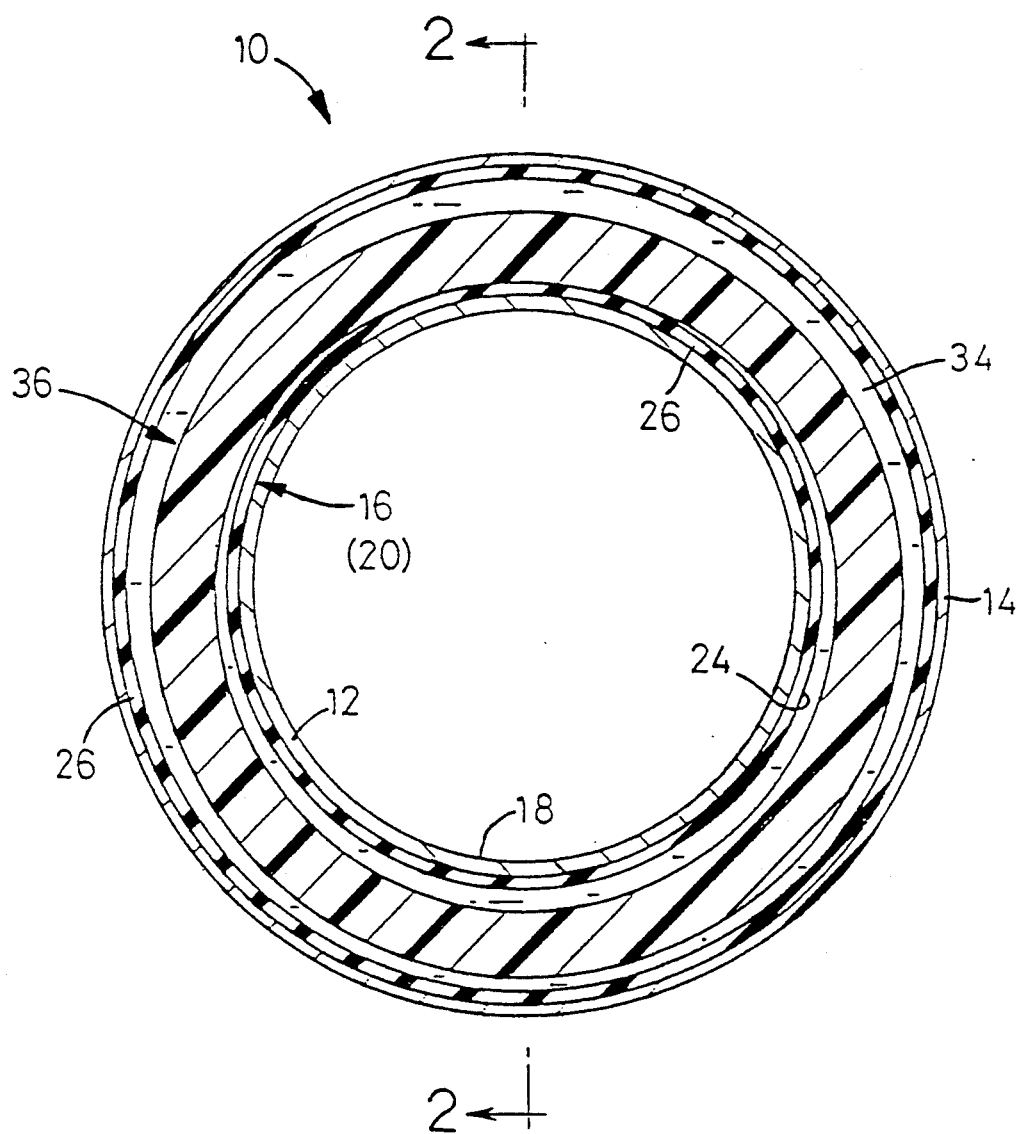
FIG. 1 is an elevational view in transverse cross section of one embodiment of a fluid-filled cylindrical elastic mount of the invention in the form of a center bearing mount for vehicle.

Referring to FIGS. 1 and 2, there is shown a fluid-filled cylindrical elastic center bearing mount 10 used for a motor vehicle. In these figures, reference numerals 12, 14 respectively denote an inner and an outer sleeve which are made of a metallic material. The outer sleeve 14 is disposed radially outwardly of the inner sleeve 12, with a suitable annular spacing therebetween. Between the inner and outer sleeves 12, 14, there is interposed a generally annular elastic body in the form of an elastic assembly 16 such that the two sleeves 12, 14 are elastically connected to each other by the elastic assembly 16. The center bearing mount 10 is installed on the motor vehicle such that a propeller shaft is inserted through an inner bore 18 of the inner sleeve 12 via a center bearing while the outer sleeve 14 is connected to the body of the vehicle, so that the propeller shaft is elastically or flexibly mounted on the vehicle body via the mount 10. In use, a vibrational load is applied between the inner and outer sleeves 12, 14, primarily in the radial directions perpendicular to the axis of the mount 10.

More specifically described, the inner sleeve 12 is a generally cylindrical member, while the outer sleeve 14 is a generally cylindrical member having a diameter larger by a predetermined value than that of the inner sleeve 12. The outer sleeve 14 is disposed radially outwardly of and concentrically with the inner sleeve 12, such that the sleeves 12, 14 are radially spaced apart from each other by a predetermined distance so as to define an annular spacing therebetween.

The elastic assembly 16 interposed between the inner and outer sleeves 12, 14 consists of a first elastic member 20 and a second elastic member 22 which are opposed to each other in the axial direction of the mount, as shown in FIG. 2. Thus, the elastic assembly 16 as a whole has a generally annular shape having a comparatively large radial wall thickness.

The first elastic member 20 is a generally annular member made of a rubber material, and is disposed at one of axially opposite end portions of the annular spacing between the mutually facing surfaces of the inner and outer sleeves 12, 14. The first elastic member 20 is secured at its inner and outer circumferential surfaces respectively to the outer circumferential surface of the inner sleeve 12 and the inner circumferential surface of the outer sleeve 14, by means of vulcanization. Thus, there is prepared a first intermediate product 23 consisting of the first elastic member 20 and inner and outer sleeves 12, 14, during manufacture of the mount 10. In the first intermediate product 23, the annular spacing between the inner and outer sleeves 12, 14 is closed at the above-indicated one axial end portion thereof by the first elastic member 20, whereby an annular pocket 24 is formed between the inner and outer sleeves 12, 14 such that the pocket 24 is open at the other axial end portion of the annular spacing between the inner and outer sleeves 12, 14.

The first elastic member 20 has integrally formed extensions in the form of relatively thin layers, which extend from radially inner and outer portions of the elastic member 20 toward the other axial end portion of the annular spacing indicated above, over the mutually facing surfaces of the inner and outer sleeves 12, 14. Thus, a pair of buffer layers 26, 26 each having a suitable thickness are provided for covering respective axially intermediate portions of the mutually facing surfaces of the inner and outer sleeves 12, 14. One of the integrally formed extensions which extends from the radially outer portion of the first elastic member 20 includes a relatively thin sealing layer 28 as well as the buffer layer 26. The sealing layer 28 covers an axial end portion of the inner circumferential surface of the outer sleeve 14 corresponding to the above-indicated other axial end portion of the annular spacing. As is apparent from FIG. 2, the sealing layer 28 has a thickness smaller than that of the buffer layers 26.

The second elastic member 22 is a generally annular member made of a rubber material, and is secured at its inner and outer circumferential surfaces to an inner support sleeve 30 and an outer support sleeve 32, respectively, by means of vulcanization. Thus, there is prepared a second intermediate product 33 consisting of the second elastic member 22, and the inner and outer support sleeves 30, 32, during manufacture of the mount 10.

The second intermediate product 33 including the second elastic member 22 is fitted into the annular spacing between the inner and outer sleeves 12, 14, so that the elastic member 22 is disposed at the other axial end portion of the annular spacing between the mutually facing surfaces of the inner and outer sleeves 12, 14, at which the pocket 24 of the first elastic member 20 is open in the axial direction of the mount 10. More specifically, the inner support sleeve 30 secured to the inner surface of the second elastic member 22 is press-fitted on the outer circumferential surface of the inner sleeve 12. With the center bearing mount 10 being radially inwardly compressed at the outer sleeve 14, the outer support sleeve 32 secured to the outer surface of the second elastic member 22 is firmly forced against the sealing layer 28 formed on the outer sleeve 14. One of axially opposite end portions of the outer sleeve 14 which is remote from the first elastic member 20 is caulked against the corresponding axial end face of the outer support sleeve 32, so that the sleeve 32 is axially held in position with respect to the outer sleeve 14. In this manner, the second intermediate product 33 is integrally assembled with the first intermediate product 23 including the inner and outer sleeves 12, 14, such that the inner and outer sleeves 12, 14 are elastically connected to each other by the first and second elastic members 20, 22 of the elastic assembly 16.

With the second intermediate product 33 being assembled with the first intermediate product 23, the pocket 24 of the first elastic member 20 is fluid-tightly closed by the second intermediate product 33 including the second elastic member 22, as shown in FIG. 2. The thus enclosed pocket 24 is filled with a suitable non-compressible fluid, to thereby provide an annular fluid chamber 34 which is formed between the inner and outer sleeves 12, 14, and which has a substantially constant cross sectional area (as seen in FIG. 2) over the entire circumference thereof.

The non-compressible fluid contained in the fluid chamber 34 has a relatively low viscosity, for a sufficient degree of fluidity of the fluid, to thereby ensure a desired vibration isolating effect based on resonance of the fluid. More specifically, the kinematic viscosity of the fluid is not higher than 100 centistokes, and preferably not higher than 30 centistokes. For example, the non-compressible fluid is suitably selected from the group which includes water, alkylene glycol, polyalkylene glycol, silicone oil, and mixtures thereof. If the kinematic viscosity of the fluid exceeds 100 centistokes, the obtained elastic mount 10 suffers from an excessively high flow resistance of the fluid within the fluid chamber 34, and accordingly suffers from insufficient vibration isolating capability.

The filling of the fluid chamber 34 with the fluid as described above may be conducted by assembling the first and second intermediate products 23, 33 within a mass of the selected fluid in a suitable vessel. Alternatively, a predetermined amount of the selected fluid may be poured into the pocket 24 of the first elastic member 20, prior to the assembling of the first and second intermediate products 23, 33.

The center bearing mount 10 further includes an annular movable member in the form of an annular block 36 which is accommodated within the fluid chamber 34. This annular block 36 is inserted into the pocket 24 of the first elastic member 20 when the first and second intermediate products 23, 33 are assembled together. The annular block 36 is an annular member having a rectangular cross sectional shape as shown in FIG. 2, which substantially follows the corresponding cross sectional shape of the fluid chamber 34. The annular block 36 has an inside diameter larger than the diameter of an inner circumferential wall of the fluid chamber 34, and an outside diameter smaller than the diameter of an outer circumferential wall of the fluid chamber 34. The axial dimension of the annular block 36 is smaller by a suitable value than that of the fluid chamber 34. The annular block 36 having external dimensions as described above is disposed in an axially intermediate portion of the fluid chamber 34, such that the annular block 36 is freely movable by a predetermined radial distance within the fluid chamber 34, in the radial directions of the mount 10.

The annular block 36 may be made of any material as long as it is not easily deformed and exhibits a sufficient resistance to corrosion by the fluid in the fluid chamber 34. For example, a material such as resin, metal or hard rubber may be suitably employed irrespective of the specific gravity of the selected material relative to that of the fluid in the fluid chamber 34.

In the instant embodiment, the annular block 36 is dimensioned such that the difference between the inside diameter of the annular block 36 and the diameter of the inner circumferential wall of the fluid chamber 34 is smaller than the difference between the outside diameter of the block 36 and the diameter of the outer circumferential wall of the fluid chamber 34. Further, the annular block 36 in the instant embodiment is made of a synthetic resin having a specific gravity larger than that of the fluid contained in the fluid chamber 34. While no dynamic vibrational load is applied to the center bearing mount 10 installed in position, therefore, the annular block 36 is supported by the inner sleeve 12 such that the inner surface of the upper portion of the annular block 36 as viewed in FIGS. 1 and 2 is held in contact with the corresponding portion of the buffer layer 26 formed on the outer circumferential surface of the inner sleeve 12.

Due to the presence of the annular block 36 accommodated in the fluid chamber 34, the fluid chamber 34 is formed annularly around the annular block 36 over the entire circumference of the annular block 36. The fluid chamber 34 consists of axially spaced-apart sections 38a, 38a, and radially inner and outer portions 38b, 38b', as shown in FIG. 2. Each of these sections 38a, 38b, 38b' functions as a narrow flow-restricting passage which provides a resistance to flows of the fluid. Thus, the annular block 36 and the fluid in the fluid chamber 34 cooperate to provide the mount 10 with a restricted resonance portion 38 through which the fluid is forced to flow upon application of a dynamic vibrational load to the mount 10. The resonance portion 38 has a substantially constant cross sectional area (as seen in FIG. 2) over the entire circumference thereof.

In the thus constructed center bearing mount 10, when a dynamic vibrational load is applied between the inner and outer sleeves 12, 14 in a certain load-receiving radial direction perpendicular to the axis of the mount 10, the inner and outer sleeves 12, 14 are radially displaced relative to each other, whereby relative volumetric changes occur between the diametrically opposite portions of the fluid chamber 34, which are opposed to each other in the above-indicated load-receiving radial direction. Consequently, the fluid in the fluid chamber 34 is forced to repeatedly flow through the resonance portion 38, alternately in the opposite circumferential directions, between the diametrically opposite portions of the chamber 34. The cross sectional area of the fluid chamber 34 (that of the restricted resonance portion 38) is suitably dimensioned or tuned so that the center bearing mount 10 provides a desired effect of isolating the input vibrations, based on the resonance of the fluid flowing in the circumferential direction of the fluid chamber 34. In this particular embodiment, the total cross sectional area of the resonance portion 38 is determined so that the mount 10 exhibits a sufficiently lowered dynamic spring constant with respect to vibrations having frequencies of about 200 Hz or higher, based on the resonance of the fluid masses which flow between the diametrically opposite portions of the fluid chamber 34, in the opposite circumferential directions.

In the center bearing mount 10 according to the present invention, the annular block 36 is disposed within the fluid chamber 34 such that its upper portion is normally held in contact with the buffer layer 26 and thus supported by the inner sleeve 12. When a vibrational load is applied between the inner and outer sleeves 12, 14 in a given load-receiving radial direction, the annular block 36 is oscillated within the fluid chamber 34 relative to the inner and outer sleeves 12, 14, in the above-indicated load-receiving radial direction. Namely, the vibrations received from the propeller shaft cause the inner sleeve 12 to be oscillated or displaced relative to the outer sleeve 14 in the opposite radial directions relative to the outer sleeve 14, thereby causing the annular block 36 to be oscillated in the same radial directions, with a given amount of time delay or a phase difference with respect to that of the inner sleeve 12. As a result, relative volumetric changes occur between the radially inner and outer sections 38b, 38b' of the resonance portion 38 at each of the diametrically opposite portions of the fluid chamber 34 which are opposed to each other in the load-receiving radial direction. Consequently, the fluid in the fluid chamber 34 is forced to flow alternately in the opposite radial directions between the radially inner and outer sections 38b, 38b' as described above, through the corresponding axially spaced-apart sections 38a, 38a of the resonance portion 38. The cross sectional shape of the fluid chamber 34 (resonance portion 38) is suitably dimensioned so that the center bearing mount 10 exhibits intended vibration isolating characteristics, based on the resonance of the fluid flowing in the resonance portion 38 in the radial directions thereof. In this particular embodiment, the cross sectional shape of the resonance portion 38 is determined so that the mount 10 exhibits a sufficiently lowered dynamic spring constant with respect to vibrations having frequencies ranging from about 50 Hz to 200 Hz, based on the resonance of the fluid masses which flow in the fluid chamber 34 in the radial directions thereof.

It will be understood from the foregoing description that the instant center bearing mount 10 can provide a sufficiently low dynamic spring constant with respect to two different frequency ranges of input vibrations, one based on the resonance of the fluid flowing in the circumferential direction of the fluid chamber 34, and the other based on the resonance of the fluid flowing in the radial direction of the chamber 34. Thus, the instant mount 10 is capable of exhibiting significantly improved isolating capability over a wide frequency range of vibrations.

In the center bearing mount 10, the resonance portion 38 is formed over the entire circumference of the fluid chamber 34, due to the presence of the annular block 36 which is placed in the fluid chamber 34 having a constant cross sectional area over the entire circumference thereof, such that the block 36 annularly extends over the entire circumference of the chamber 34. Accordingly, the fluid in the fluid chamber 34 is effectively forced to flow through the restricted resonance portion 38 in the circumferential and radial directions, when the vibrations are applied to the mount 10 in any radial direction perpendicular to the axis of the mount 10. Thus, the instant center bearing mount 10 can effectively and stably provide an excellent vibration isolating effect, based on the resonance of the fluid flowing through the restricted resonance portion 38 in the circumferential and radial directions of the fluid chamber 34.

The use of the center bearing mount 10 constructed as described above is effective to reduce the rate of transmission of vibrations from the propeller shaft to the vehicle body, since the instant mount 10 exhibits excellent isolating capability for a wide frequency range of vibrations applied in any radial direction perpendicular to the axis of the mount 10. In addition, the vibration isolating characteristics of the mount 10 are not influenced by the radial direction in which the mount 10 is installed. Therefore, the instant mount 10 need not be precisely positioned in the radial direction thereof when the mount 10 is installed on the motor vehicle. This means a significantly improved efficiency in the installation of the mount 10 on the motor vehicle.

In the center bearing mount 10 according to the present invention, the restricted resonance portion 38 can be formed around the resonance block 36, only by placing the annular block 36 in the fluid chamber 34 when the first and second intermediate products 23, 33 described above are assembled together. This arrangement does not require a complicated orifice device for defining an orifice or flow-restricting passage for fluid communication in the fluid chamber 34. Thus, the instant center bearing mount 10 having excellent vibration isolating capability is considerably simple in construction, and can therefore be easily produced with high efficiency.

The elastic assembly 16 of the instant center bearing mount 10 consists of the first elastic member 20 disposed at one of axially opposite ends of the mount 10 for elastically connecting the inner and outer sleeves 12, 14 and defining the pocket 24 between the sleeves 12, 14, and the second elastic member 22 disposed at the other axial end of the mount 10 for closing the opening of the pocket 24. In this arrangement, the fluid chamber 34 may be filled with the non-compressible fluid, only by pouring a predetermined amount of the fluid into the pocket 24 of the first intermediate product 23 when the first and second intermediate products 23, 33 are assembled together. Thus, the filling of the fluid chamber 34 in the instant embodiment does not require a cumbersome process in which the components of the mount are assembled within a fluid mass.

While the present invention has been described in detail in its presently preferred embodiment, for illustrative purpose only, it is to be understood that the invention is not limited to the details of the illustrated embodiment.

For example, the elastic assembly 16 consisting of the first and second elastic members 20, 22 may be replaced by an integrally formed one-piece elastic member having a thick-walled, annular shape, which is secured to the outer circumferential surface of the inner sleeve 12. The elastic body has a recessed portion formed therein, which is open to the outer circumferential surface thereof. The opening of the recessed portion is closed by the outer sleeve 14, whereby a fluid chamber corresponding to the recessed portion is defined between the elastic body and the outer sleeve 14.

In the illustrated embodiment, the difference between the inside diameter of the annular block 36 and the diameter of the inner circumferential wall of the fluid chamber 34 is made smaller than the difference between the outside diameter of the block 36 and the diameter of the outer circumferential wall of the fluid chamber 34. While no dynamic vibrational load is applied to the mount 10, therefore, the annular block 36 is supported by the inner sleeve 12 with a part of the inner circumferential surface of the block 36 being held in contact with the corresponding portion of the buffer layer 26 on the outer circumferential surface of the inner sleeve 12. However, the annular block 36 may be constructed such that the difference between the inside diameter of the annular block 36 and the diameter of the inner circumferential wall of the fluid chamber 34 is larger than the difference between the outside diameter of the block 36 and the diameter of the outer circumferential wall of the fluid chamber 34. In this case, the annular block 36 is supported at its outer circumferential surface by the outer sleeve 14, through the buffer layer 26, while no vibrational load is applied to the mount 10.

Although the illustrated embodiment is adapted to be used as a center bearing mount for a motor vehicle, the concept of the invention may be embodied as engine mount and suspension bushings for a motor vehicle, and other fluid-filled elastic mounts whose applications are not limited to the motor vehicle.

It is to be understood that the present invention may be embodied with various other changes, modifications and improvements, which may occur to those skilled in the art, without departing from the spirit and scope of the invention defined in the following claims.

What is claimed is:

1. A fluid-filled cylindrical elastic mount for flexibly connecting two members, comprising:

an inner sleeve attached to one of said two members;

an outer sleeve attached to the other of said two members, and disposed radially outwardly of said inner sleeve with a predetermined radial spacing therebetween;

generally annular elastic body interposed between said inner and outer sleeves for elastic connection therebetween, said elastic body at least partially defining an annular fluid chamber formed between the inner and outer sleeves and extending over an entire circumference of the mount, said fluid chamber having a substantially constant cross sectional area over the entire circumference of the mount, and being filled with a non-compressible fluid having a kinematic viscosity of not higher than 100 centistokes; and a rigid annular movable member having a generally rectangular cross sectional shape and a radial wall thickness, said annular movable member being accommodated in said fluid chamber such that said movable member can be radially displaced within the fluid chamber relative to said inner and outer sleeves, said movable member and said fluid in said fluid chamber cooperating to provide a restricted resonance portion, said annular movable member having a radially inner circumferential space having axial dimension larger than said radial wall thickness thereof, and being dimensioned such that said resonance portion comprises a pair of axially spaced-apart sections spaced apart from each other by said movable member in an axial direction of the mount, and a radially inner section and a radially outer section which are spaced apart from each other by said movable member in a radial direction of the mount, said non-compressible fluid being forced to flow with a resistance in said radial direction through said axially spaced-apart sections, and in a circumferential direction of the mount through said axially spaced-apart sections and said radially inner and outer sections, upon application of a vibrational load between the inner and outer sleeves.

2. A fluid-filled cylindrical elastic mount according to claim 1, wherein said non-compressible fluid has a kinematic viscosity of not higher than 30 centistokes.

3. A fluid-filled cylindrical elastic mount according to claim 1, wherein said movable member has an inside diameter which is larger than a diameter of an inner circumference of said fluid chamber, and an outside diameter which is smaller than a diameter of an outer circumference of the fluid chamber, to define said radially inner and outer sections of said resonance portion, said movable member further having an axial dimension which is smaller than that of the fluid chamber, to define said axially spaced-apart sections of said resonance portion.

4. A fluid-filled cylindrical elastic mount according to claim 3, wherein a difference between the inside diameter of said movable member and the diameter of the inner circumference of said fluid chamber is smaller than a difference between the outside diameter of said movable member and the diameter of the outer circumference of said fluid chamber.

5. A fluid-filled cylindrical elastic mount according to claim 1, wherein said elastic body consists of first and second annular elastic members which are opposed to each other in the axial direction of the mount, said first elastic member having a pocket formed to extend over the entire circumference of said mount such that an opening of said pocket is closed by said second elastic member to thereby provide said fluid chamber defined between the first and second elastic members.

6. A fluid-filled cylindrical elastic mount according to claim 5, further comprising inner and outer support members which are respectively secured to inner and outer circumferential surfaces of said second elastic member, for connecting said second elastic member to said inner and outer sleeves.

7. A fluid-filled cylindrical elastic mount according to claim 1, wherein said movable member is made of a synthetic resin having a specific gravity larger than that of said non-compressible fluid.

8. A fluid-filled cylindrical elastic mount according to claim 1, wherein said kinematic viscosity of said non-compressible fluid and dimensions of said axially spaced-apart and radially inner and outer sections are determined such that vibrations having frequencies of not lower than about 200 Hz are isolated based on a resonance of masses of said fluid which flow in said circumferential direction through said axially spaced-apart and radially inner and outer sections.

9. A fluid-filled cylindrical elastic mount according to claim 1, wherein said kinematic viscosity of said non-compressible fluid and dimensions of said radially inner and outer sections are determined such that vibrations having frequencies of about 50 Hz–200 Hz are isolated based on a resonance of masses of said fluid which flow in said radial direction through said axially spaced-apart sections.

* * * * *